June 19, 1945. S. C. CARNEY 2,378,685
ISOMERIZATION PROCESS
Filed Oct. 5, 1942
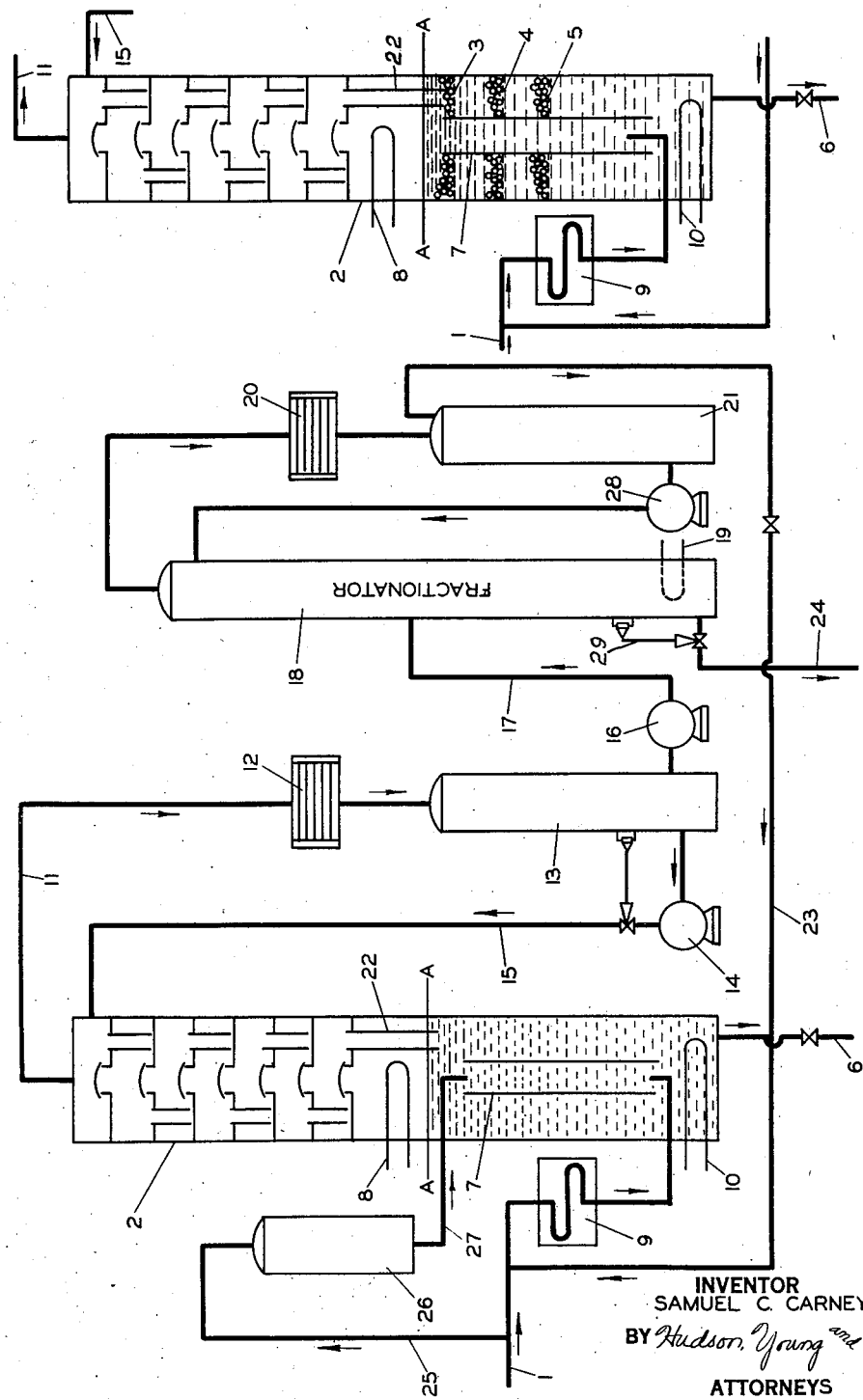
INVENTOR
SAMUEL C. CARNEY
BY Hudson, Young and Yinger
ATTORNEYS Patented June 19, 1945

2,378,685

UNITED STATES PATENT OFFICE 2,378,685

ISOMERIZATION PROCESS

Samuel C. Carney, Bartlesville, Okla., assignor to Phillips Petroleum Company, a corporation of Delaware Application October 5, 1942, Serial No. 460,863

8 Claims. (Cl. 260—683.5)

This invention relates to an isomerization process and more particularly to a process of isomerizing normal butane to isobutane by means of an aluminum halide catalyst, preferably solid anhydrous aluminum chloride, and in the presence of a hydrogen halide, usually hydrogen chloride.

Commercial isomerization of normal butane to isobutane is effected in the vapor phase over solid aluminum chloride and in the presence of hydrogen chloride. One of the reasons for using vapor phase instead of liquid phase is that the carrying out of the reaction zone of aluminum chloride dissolved in the liquid effluent is avoided. One of the principal difficulties with such a process is the sublimation of aluminum chloride whereby it passes from the reactor in admixture with the effluent hydrocarbons. It has heretofore been the practice to operate such a vapor phase isomerization at a pressure of the order of 10 atmospheres to minimize this sublimation. The formation of a liquid phase in the reactor has commonly been prevented by the use of superheated vapor phase. Attempts have likewise been made to control the factors of reaction temperature, dissipation of reaction heat, and volatilization of catalyst by controlling the temperature and partial pressure of the butane vapor and by quenching with limited amounts of butane liquid introduced along the reaction zone. However, the process described was always intended to be and was in practice essentially a single vapor phase system with respect to the hydrocarbon in process.

Thus, even though liquid phase isomerization is highly superior in principle to vapor phase isomerization, the former is not used on an industrial scale so far as I am aware, due to numerous difficulties in connection therewith. Among the disadvantages of vapor phase operation are the inferior contact with the catalyst, the difficulties of preventing volatilization of the catalyst, the volume of hydrocarbons that must be handled which frequently amount to 15 to over 20 volumes per volume of liquid, the rapid flow rate with attendant accelerated erosion of equipment, etc. These disadvantages are completely overcome by liquid phase operation.

The principal object of the present invention is to provide an improved process for the isomerization of normal butane to isobutane using aluminum halide as the catalyst. Another object is to provide a process of the foregoing type but conducted in the liquid phase. Another object is to avoid loss of aluminum chloride from the reaction zone. Another object is to promote the complete utilization of the activity of the catalyst. Another object is to eliminae difficulties in parts of the equipment other than the reaction zone due to the sublimation of aluminum chloride. Numerous other objects will hereinafter appear.

In the accompanying drawing Fig. 1 shows diagrammatically one form of apparatus which has been found to be particularly useful in carrying out the invention in a preferred embodiment wherein catalyst is continuously fed into the reaction zone at the same rate as that at which it is withdrawn in the form of sludge, and Fig. 2 shows a modified arrangement adapted for use in a somewhat less preferred embodiment in which a bed of solid catalyst is disposed in the reaction zone. In this figure the recovery equipment shown in the right hand portion of Fig. 1 is omitted in order to avoid duplication.

In accordance with my invention, using the isomerization of normal butane to isobutane with aluminum chloride or aluminum bromide as the catalyst in the presence of the corresponding hydrogen halide as an exemplary operation, the normal butane at least partly in vapor form, is continuously introduced into a reaction zone in which liquid-vapor phase is maintained, in such a manner that automatic liquid circulation is effected by reason of the gas lifting action of the vapor so introduced. In this reaction zone the conversion of the normal butane to isobutane takes place.

In order to achieve the circulatory effect just described it is preferred to employ a circulation tube centrally disposed in the reactor and extending vertically through a substantial portion of the reaction zone. The incoming hydrocarbon vapor or vapor-liquid is fed into the bottom of this tube and passes upwardly therein exerting a gas lift action. The liquid so lifted, upon reaching the top of the tube passes downwardly on the outside of the tube. In this way the liquid is continuously circulated in an endless path without mechanical agitation and the reaction is greatly accelerated. The circulation tube is preferably of substantial diameter compared to the diameter of the reaction zone, say from one-fourth to three-fourths of the diameter of the reaction zone. Under some circumstances it may be desirable to use a circulation tube whose area is equal to the area of the space between it and the reactor wall.

As the reaction proceeds sludge accumulates in the bottom of the reactor and may be continuously withdrawn at a rate equivalent to its rate of formation. Sludge present in the downwardly flowing outside portion of the reactor, being heavier, tends to be thrown into the bottom of the reactor and is thus removed from the circulatory system.

Hydrogen halide usually corresponding to the aluminum halide employed as catalyst, is present in the reactor being introduced in any suitable manner, conveniently in admixture with the hydrocarbon feed.

Superimposed upon, and in communication with the vapor space of, the reaction zone is a fractionating column the purpose of which is to return to the reaction zone substantially all of the volatilized aluminum chloride or bromide in the reaction of effluent vapors, but not to effect any other fractionation. The fractionator is provided with reflux at its top, and returns to the reaction zone all of the aluminum halide in admixture with liquid hydrocarbon in amount equal to the reflux.

The fractionator and reaction zone are maintained under a pressure sufficient to keep the major part of the hydrocarbons in the reaction zone in liquid phase. The temperature in the reaction zone is maintained at the boiling point of the reaction mixture under the pressure maintained. Volatilization of hydrocarbons from the liquid phase and passage thereof into the fractionator take place. Admixed with the hydrocarbons are aluminum halide vapors all of which are condensed in the rectifying column and returned to the reactor.

The hydrocarbons not condensed in the fractionating column pass out overhead and after return of a suitable proportion of the condensed overhead as reflux the balance is passed to a recovery unit in which the hydrogen halide is separated for recycle to the reactor. The hydrocarbons may be resolved to separate the product isobutane from unchanged normal butane which is advantageously recycled.

An important feature of the invention is the maintenance of substantially constant liquid level in the reaction zone. I have found that this may be accomplished by providing a heating element in the reaction zone with its lower portion at about the level of the liquid desired to be maintained. Then if the liquid level rises it comes into contact with or surrounds the heating element and is vaporized thereby lowering the level until it is below the heating element. This is especially effective because the heat transfer between the heating element and the vapor is small whereas that between the element and the liquid is relatively great.

The catalyst may be in the form of a bed of solid but is preferably in suspension and/or solution in the hydrocarbon. An especially advantageous mode of operation in which suspension or solution is maintained is to continuously pass at least a portion of the hydrocarbon feed in liquid form through a unit in which it dissolves and/or suspends the aluminum halide and whence the solution or suspension formed is continuously passed into the reaction zone at a rate such that the fresh aluminum halide so fed thereinto is substantially equal in amount to the aluminum halide present in the catalyst sludge continuously accumulating in and withdrawn from the bottom of the reactor.

Less preferably, a bed of the solid aluminum halide may be disposed in the reactor itself. The difficulty with this is that there is frequently a tendency for the lumps to stick together or coalesce to a relatively impervious mass. However, this type of operation may be used to advantage under some circumstances. When it is used, I prefer to arrange the catalyst annularly around the centrally disposed circulation tube which extends through the catalyst bed and into which the incoming hydrocarbon vapor is introduced to effect the gas lift and upward flow of liquid through the tube. Upon leaving the top of the tube the liquid flows downwardly through the surrounding catalyst in an endless circulatory path as before. When using this type of operation, an advantage is that the downward liquid flow in the outer annular catalyst-filled space carries any sludge formed therein downwardly thereby aiding in keeping the catalyst surface sludge-free.

An important advantage of the process as described is the extremely good thermal stability of the two-phase system (liquid-vapor) maintained at the transition point, namely the boiling point. Another advantage is the concentration of material in a hydrocarbon liquid phase is many times greater than in vapor phase with the result that equipment of smaller volume may be used. Furthermore the process utilizes the advantages of a catalyst in contact with and/or in solution in a hydrocarbon liquid as compared with contact of hydrocarbon in vapor phase with a solid catalyst as in prior processes. It entirely prevents loss of catalyst by vaporization. In addition it provides for perfect removal of heat of reaction even when that be variable in amount.

*Embodiment of Fig. 1*

Referring to Fig. 1 of the drawing, the normal butane feed enters the system in liquid form via line 1, whence the major proportion passes through heater 9 where it is brought to the reaction temperature, a portion or all thereof being vaporized. The so heated feed then enters the reaction zone which is shown as the lower portion of unit 2, being injected upwardly within the circulation tube 7 which is disposed wholly within the liquid phase, the liquid level being approximately indicated by line A—A. A portion of the liquid butane feed is diverted via line 25 to mixing or dissolving unit 26 which contains powdered aluminum halide. The resulting solution or suspension passes via line 27 into the reaction zone.

The lowermost portion of unit 2 is a settling chamber for sludge and from it sludge is withdrawn continuously or intermittently via line 6. The reactor is provided with a heating element 8 which functions to maintain the liquid level of the reaction mixture substantially constant, and with heating element 10 whose chief or sole function is to keep the sludge relatively less viscous so as to facilitate withdrawal.

The upper portion of the unit 2 is the fractionating column which may be equipped with bubble plates as shown or with packing.

Vapor from the top of the unit 2 leaves via line 11, is condensed by condenser 12 and the condensate collected in receiving tank 13. Reflux to the fractionator is pumped from tank 13 by pump 14 through line 15. Isomerized product free from aluminum halide but containing dissolved hydrogen halide is pumped from tank 13 by pump 16 through line 17 to the feed plate of rectifying column 18. In column 18, which is heated by heater 19 and supplied with reflux by condenser 20, accumulator 21 and pump 28, the dissolved hydrogen halide is distilled overhead and returned from the vapor space of accumulator 21 via line 23 to reenter the reactor of unit 2, as by merging with the feed in line 1.

The desired hydrocarbon product, namely the mixture of isobutane and unconverted normal butane, is removed as bottoms from fractionator 18 via line 24.

The condensed aluminum halide together with hydrocarbon in amount equal to the amount of reflux returned via line 15 accumulates on the bottom plate of the fractionation section of unit 2 and is overflowed continuously therefrom via pipe 22. The bottom of pipe 22 should be liquid sealed to prevent vapors from having access thereto. This may be done conveniently by extending pipe 22 to below the liquid level A—A. Or a cup may be placed over the bottom end of pipe 22. If desired this cup may be arranged to empty on heating element 8.

Operation

The operation is concerned only with the physical manipulation of the materials used. The chemical aspects as to nature and amount of catalyst, pressure, temperature and time of contact, etc., are known in the art of isomerization. The basic essential of the process is that, while operating at the temperature desired for chemical reasons, a sufficient amount of heat shall be supplied to vaporize the isomerized butane and the unreacted butane plus the reflux returned through line 15. This heat comes from several sources namely the heater 9 which heats or evaporates the normal butane feed, the heat of the reaction, and the heat supplied by heating elements 8 and 10.

It is preferred that the feed entering the reaction zone via line 1 be in part vapor but principally (say from 75 to 90%) heated liquid. The vaporous part acts as a gas lift in tube 7 to induce a flow upward therethrough and downwards in the annular space therearound. The heater 10 delivers only a relatively small amount of heat for the purpose only of maintaining sludge at a low viscosity and not to boil it.

If desired the arrangement may be such that the reflux liquid returned by the fractionating section of unit 2 is poured directly over the heating element 8. Since the liquid downflow from the fractionating section contains a minimum amount of aluminum halide and substantially no sludge, sublimation of aluminum halide may in this way be minimized, and coil 8 is prevented from getting coated or caked with material causing low heat transfer.

Above each plate of the fractionating section of unit 2 there is both a liquid and a vapor phase. In this section all vapor of aluminum halide is condensed and dissolved and/or suspended in the liquid downflow and none is carried into condenser 12 or other later parts of the apparatus.

The operating pressure on the unit 2 is the vapor pressure of the liquid in tank 13 with its dissolved hydrogen halide and other products of the reaction plus the pressure drop of the system. The liquid level in the reactor may be approximately adjusted to the desired point by increasing or decreasing the amount pumped from tank 13 by pump 16 which may be done in known manner by a level control located at line A—A. The amount of the reflux is all liquid in tank 13 which is not removed by pump 16. The sufficiency of this amount is governed by regulating the heat input of heater 8 (not the temperature resulting from the action of that heater) so as to evaporate such an amount of liquid as when added to that vaporized by the heat of reaction and contained in the feed as vapor will produce a total amount of vapor equal when condensed to the total liquid product removed plus the reflux necessary to return vaporized aluminum halide to the reactor of unit 2.

The column 18 is known in the recent art of isomerization and is so operated that substantially all hydrocarbons from the reaction leave by line 24 controlled by level control 29 except that proportion of lighter hydrocarbons, usually propane, ethane, or methane and possibly hydrogen, which are returned together with hydrogen halide through line 23 back to feed line 1.

A marked advantage of the type of operation described is that aluminum chloride and sludge corrosion is confined to the reactor. Also the movement of sludge may be minimized by control of the rate of circulation by vapor in tube 7. Moreover, but one pump need be exposed to anhydrous hydrogen chloride, since a single pump may perform the functions of both pumps 14 and 16. By reason of the longer contact time made possible and the more intimate contact, reaction temperature may be lower than in vapor phase operation. Numerous other advantages will be obvious to those skilled in the art.

Embodiment of Fig. 2

In Fig. 2, the catalyst is arranged on perforated annular shelves 3, 4 and 5 disposed in the reactor and surrounding circulation tube 7. The catalyst in lump form is placed on these shelves before starting operation. The arrangement of Fig. 1 for feeding aluminum chloride in dissolved or slurry form is dispensed with. Operation will be obvious in view of the foregoing.

General

While the foregoing relates specifically to the isomerization of normal butane to isobutane especially with aluminum chloride in the presence of anhydrous HCl, it is to be understood that the process may though less preferably be applied to isomerization of higher paraffins, e. g., normal pentane and hexane.

The invention is not to be considered as limited by the foregoing illustrative details but only by the terms and spirit of the appended claims.

I claim:

1. The process of isomerizing normal butane to isobutane which comprises continuously carrying out the following steps: introducing the normal butane at least partially in vapor form into a centrally located vertical circulation zone in a reaction zone containing liquid butane, causing said vapor to lift the liquid therein, causing the liquid attaining the top of said circulation zone to pass downwardly in a portion of said reaction zone surrounding said circulation zone and thereby establishing an endless flowing circuit of reaction materials, contacting said butane in said reaction zone with aluminum halide catalyst in the presence of hydrogen halide to effect isomerization thereof, maintaining said reaction zone at the boiling point of the liquid under the pressure prevailing, removing vaporized hydrocarbons, aluminum halide, and hydrogen halide from said reaction zone and introducing them into a fractionating zone, maintaining said fractionating zone at substantially the same pressure as said reaction zone, condensing volatilized aluminum halide in said fractionating zone and returning it to said reaction zone, and removing overhead from said fractionating zone vapors comprising isobutane, unchanged normal butane, and hydrogen halide.

2. The process of claim 1 in which said overhead is condensed and a portion thereof is returned to the top of said fractionating zone as reflux therefor, and in which liquid hydrocarbons equivalent to the amount of said reflux are returned to said reaction zone in admixture with said condensed aluminum halide.

3. The process of claim 1 in which said reaction zone is free from aluminum halide in massive form and wherein a portion of liquefied normal butane is continuously admixed with particulate aluminum halide in a separate zone to form a highly mobile mixture which is continuously introduced to the reaction zone at a rate substantially equal to that at which aluminum halide is spent therein by sludge formation.

4. The process of claim 1 in which massive aluminum halide is disposed in said portion of said reaction zone surrounding said circulation zone.

5. The process of claim 1 in which heat is supplied at all times at a point in said reaction zone just above that at which the level of liquid therein is to be maintained, whereby substantially constant maintenance of said level at said point is attained.

6. The process of isomerizing a normal paraffin to an isoparaffin which comprises introducing the normal paraffin at least partially in vapor form into a liquid body of said normal paraffin and said isoparaffin in a reaction zone, maintaining said reaction zone substantially full of said liquid body, maintaining said liquid at the boiling point under the pressure prevailing, effecting agitation and circulation of said liquid body by gas lifting action of the vaporized normal paraffin so introduced, contacting said normal paraffin in said reaction zone with an aluminum halide as a catalyst in the presence of hydrogen halide to effect isomerization thereof, removing a vaporized stream of hydrocarbons, hydrogen halide, and aluminum halide from said reaction zone and introducing same directly into a fractionating zone, maintaining said reaction and fractionating zones under substantially the same pressure which pressure is sufficient to keep the major part of the hydrocarbons in the reaction zone in liquid phase, fractionating said stream in said fractionating zone in such manner as to condense substantially all volatilized aluminum halide in said fractionating zone but without effecting any substantial separation between the normal paraffin and the isoparaffin, returning the aluminum halide so condensed to said reaction zone in admixture with liquid hydrocarbon in amount equal to the reflux, removing from said fractionating zone an overhead of hydrocarbon vapors free from aluminum halide and comprising hydrogen halide and both unchanged normal paraffin and the product isoparaffin, condensing said overhead to form a liquid free of aluminum halide, and feeding at least a portion of said liquid into the top of said fractionation zone as reflux therefor.

7. The process of isomerizing a normal paraffin to an isoparaffin which comprises introducing the normal paraffin into a liquid body of said normal paraffin and said isoparaffin in a reaction zone, maintaining said reaction zone substantially full of said liquid body, maintaining said liquid at the boiling point under the pressure prevailing, contacting said normal paraffin in said reaction zone with an aluminum halide as a catalyst in the presence of hydrogen halide to effect isomerization thereof, removing a vaporized stream of hydrocarbons, hydrogen halide, and aluminum halide from said reaction zone and introducing same directly into a fractionating zone, maintaining said reaction and fractionating zones under substantially the same pressure which pressure is sufficient to keep the major part of the hydrocarbons in the reaction zone in liquid phase, fractionating said stream in said fractionating zone in such manner as to condense substantially all volatilized aluminum halide in said fractionating zone but without effecting any substantial separation between the normal paraffin and the isoparaffin, returning the aluminum halide so condensed to said reaction zone in admixture with liquid hydrocarbon in amount equal to the reflux, removing from said fractionating zone an overhead of hydrocarbon vapors free from aluminum halide and comprising hydrogen halide and both unchanged normal paraffin and the product isoparaffin, condensing said overhead to form a liquid free of aluminum halide, and feeding at least a portion of said liquid into the top of said fractionation zone as reflux therefor.

8. The process of isomerizing a normal paraffin to an isoparaffin which comprises continuously carrying out the following steps: introducing a normal paraffin to be isomerized at least partially in vapor form into a centrally located vertical circulation zone in a reaction zone, causing said vapor to lift liquid reaction mixture comprising said normal paraffin and said isoparaffin within said vertical circulation zone, causing liquid attaining the top of said circulation zone to pass downwardly in a portion of said reaction zone surrounding said circulation zone and thereby establishing an endless flowing circuit of reaction materials, contacting said normal paraffin in said reaction zone with aluminum halide isomerization catalyst in the presence of hydrogen halide to effect isomerization thereof, maintaining liquid in said reaction zone at its boiling point under the pressure prevailing, removing from said reaction zone a mixture comprising isoparaffin so produced and substantial amounts of unchanged normal paraffin, and recovering said isoparaffin therefrom in a fractionation zone separate from said reaction zone.

SAMUEL C. CARNEY.